Jan. 10, 1967  R. J. BRANSTEN  3,297,225
CAN BODY
Filed May 13, 1964

INVENTOR.
ROBERT J. BRANSTEN
BY
ATTORNEYS

United States Patent Office 3,297,225
Patented Jan. 10, 1967

3,297,225
CAN BODY
Robert J. Bransten, San Francisco, Calif., assignor to M.J.B. Co., a corporation of Delaware
Filed May 13, 1964, Ser. No. 366,997
1 Claim. (Cl. 229—3.5)

This invention relates to a can body and the method of making the same and more particularly relates to a can body which includes a thin steel foil which has been laminated to one or both sides to a relatively thick fibrous sheet.

In the past it has been the universal practice to make tin cans and particularly those cans which were designed for pressure or vacuum service, from thin sheets of steel which had been tin-plated. Such sheets are formed into cylindrical can bodies with a soldered side seam and ends are then applied in known manner. Although such cans are satisfactory from the standpoint of preserving food, they are relatively expensive since large quantities of steel are used in the making of such cans.

Recently it has been possible to make steel foils ranging from 0.0005 to 0.0033 inch in thickness. These steel foils can be plated on one or both sides with tin and then laminated to a relatively thick fiberboard sheet utilizing known adhesives. The tin-plated steel foil forms a protective container which can be soldered, while the relatively thick fibrous sheet gives the desired rigidity to the structure. In accordance with one embodiment of the invention the paper or fibrous sheet has steel foil laminated on both sides thereof while in accordance with another embodiment of the invention one side of the sheet comprises thin steel foil while the opposite side has a plastic coating thereon. By making the outside lamination of tin-plated steel, a container is provided which can be formed and soldered on conventional can body-making equipment while the plastic gives adequate protection for many products and particularly dry products such as coffee, popcorn or nuts.

In the drawings forming part of this application:

Figure 1:
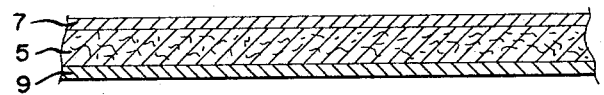
FIGURE 1 is a sectional view of a laminated sheet suitable for use in practicing the present invention.
Figure 2:
FIGURE 2 is a similar sectional view showing the laminated sheet wherein one side of the lamination comprises a thin steel foil while the opposite side comprises a thin plastic film.

Referring now to the drawings by reference characters, there is shown in FIGURES 1 and 2, suitable laminated sheets for use in practicing the present invention. In FIGURE 1 there is shown the fibrous inner member such as paper 5 with metal foils 7 and 9 laminated on each side thereof utilizing suitable adhesives. The metal foils 7 and 9 are thin steel foils having a tin-plating thereover so that the combined thickness of the foil and the tin-plating is from about 0.0005 to 0.0033 inch in thickness. The center paper layer is from 0.01 to 0.10 inch in thickness. Although the metal foil has been described as a thin steel foil with a tin-plating on both sides thereof, it is also possible to employ a steel foil having tin-plating on only the outer surface thereof since the steel itself will bind to the paper core.

In FIGURE 2 a somewhat similar laminate is shown having a center core 11 of paper, which can be the same thickness as was described in connection with FIGURE 1 and having a thin tin-plated steel foil 13 laminated on one side thereof and having a plastic surface 15 on the opposite surface thereof. The foil 13 can be as described above while the plastic 15 can have similar dimensions or be somewhat thicker than the foil. The plastic may be applied as a solution to the paper so that the plastic film is formed in situ as the solvent evaporates or a preformed plastic film can be adhesively applied to the paper.

Figure 4:
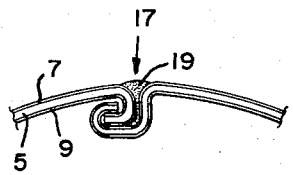
FIGURE 4 is an enlarged sectional view of the lock seam of the can body of FIGURE 3.
Figure 3:
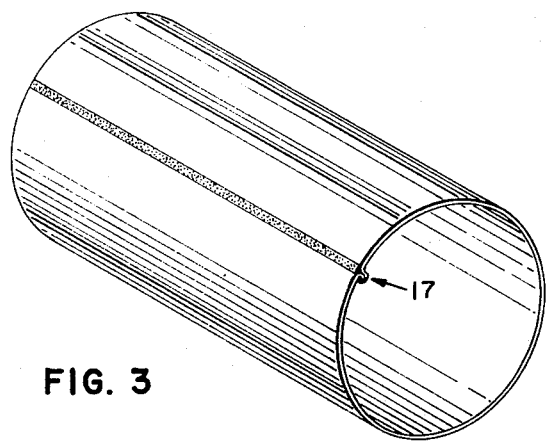
FIGURE 3 is a perspective view of a formed can body embodying the present invention.

Laminates such as those described above may be used on conventional can body-making machinery to produce can bodies. In FIGURE 3 there is shown a finished can body while in FIGURE 4 an enlarged detail is shown of the lock seam of such a can body. In accordance with the invention, the can body is formed of a laminate such as that described above in connection with FIGURE 1 having an outer metal layer 7, an inner core 5 and an inner metal foil 9. A lock seam is formed as is shown at 17 and the seam is then soldered with solder 19 using conventional can soldering equipment. If a plastic laminate is used, such as that disclosed in FIGURE 2, the plastic layer would be on the inside of the can so that the solder would be applied to the outer layer 13. If desired, the inside of the seam can be soldered also, in the case of the can having the inner metal laminate or an adhesive can be applied to the inside of the seam in the case of either the metal or plastic inner ply.

Various forms of cans may be made utilizing the technique of the present invention such as cans for products without pressure such as fruits and vegetables, vacuum packed products such as coffee or nuts, or pressure packed products such as beer.

I claim:

As a new article of manufacture a can body consisting of a central paper member with outer foil members laminated thereto and covering the sides thereof, said outer foil members comprising thin steel sheets having a tin-plating on the exposed surfaces thereof, said can body having a straight side seam, said side seam being a soldered lock joint.

References Cited by the Examiner

UNITED STATES PATENTS

| | | | |
|---|---|---|---|
| 2,342,109 | 2/1944 | Atkinson | 220—77 X |
| 2,830,001 | 4/1958 | Barnes. | |
| 2,848,151 | 8/1958 | O'Neil | 229—3.5 X |
| 2,970,736 | 2/1961 | Baughan | 229—3.5 |
| 2,982,457 | 5/1961 | D'Alelio | 229—3.5 |
| 3,083,876 | 4/1963 | Schneider | 229—3.5 X |
| 3,242,829 | 3/1966 | White | 229—3.5 X |

LOUIS G. MANCENE, *Primary Examiner.*

GEORGE E. LOWRANCE, *Examiner.*